United States Patent
Watters

[11] Patent Number: 5,871,280
[45] Date of Patent: Feb. 16, 1999

[54] PET BAG

[76] Inventor: William Watters, 37427 Hidden Valley Dr., Cave Creek, Ariz. 85331

[21] Appl. No.: 730,473

[22] Filed: Oct. 11, 1996

[51] Int. Cl.⁶ ..................................................... B65D 33/36
[52] U.S. Cl. .............................. 383/41; 383/66; 383/906; 206/216
[58] Field of Search .................... 383/6, 38, 40, 383/41, 2, 66; 190/111; 150/117; 206/216; 426/115

[56] References Cited

U.S. PATENT DOCUMENTS

| | | | |
|---|---|---|---|
| 2,510,918 | 6/1950 | Wax | 150/117 X |
| 3,150,640 | 9/1964 | Nevitt | 383/41 X |
| 3,292,747 | 12/1966 | Dawson | 383/2 X |
| 3,547,079 | 12/1970 | Bassett | 383/41 X |
| 4,119,181 | 10/1978 | Jones | 190/51 |
| 4,212,377 | 7/1980 | Weinreb | 383/38 X |
| 4,231,326 | 11/1980 | Hager | 119/52 R |
| 4,805,749 | 2/1989 | Gerch | 150/117 X |
| 4,941,603 | 7/1990 | Creamer et al. | 190/111 X |
| 5,265,719 | 11/1993 | Wand | 206/223 |
| 5,427,453 | 6/1995 | Cloessner | 383/41 X |
| 5,447,227 | 9/1995 | Koseberg | 206/233 |

*Primary Examiner*—Jes F. Pascua
*Attorney, Agent, or Firm*—Parsons & Goltry; Robert A. Parsons; Michael W. Goltry

[57] ABSTRACT

A pet bag for storing and dispensing pet food, comprising a chamber wall bounding an interior chamber, an access opening formed through the chamber wall for accessing the chamber, whereby pet food may be placed into the interior chamber through the access opening for allowing efficient storage and transport of the pet food, and a dispense opening formed through the chamber wall for allowing a user to selectively dispense the pet food from the interior chamber.

2 Claims, 5 Drawing Sheets

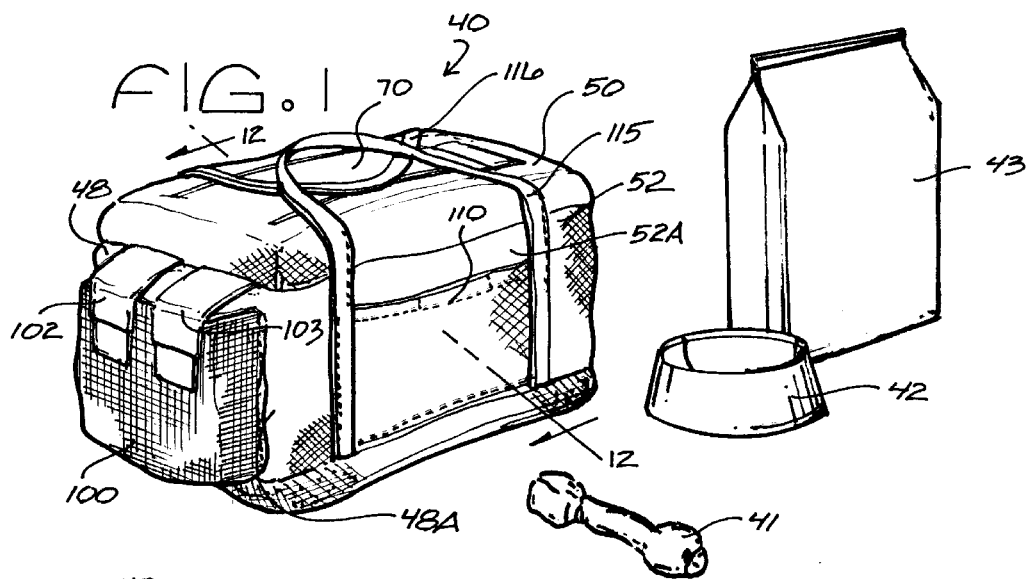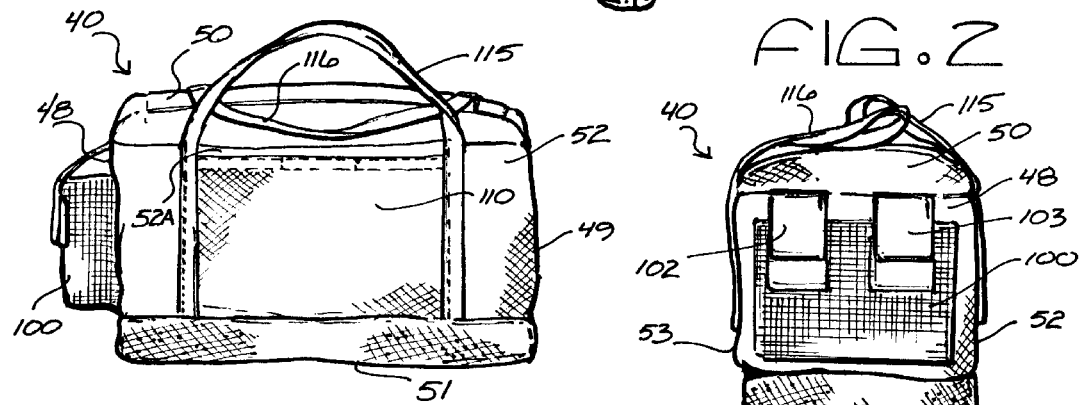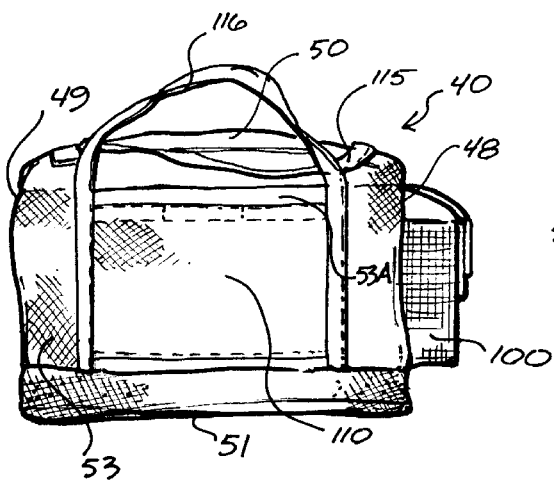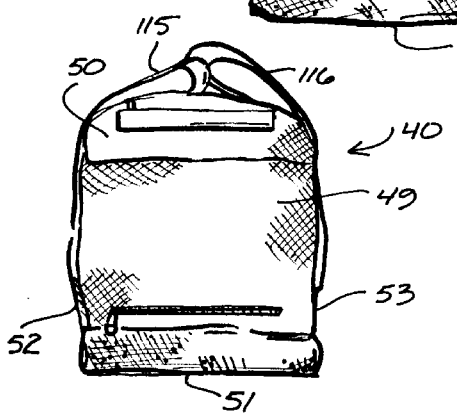

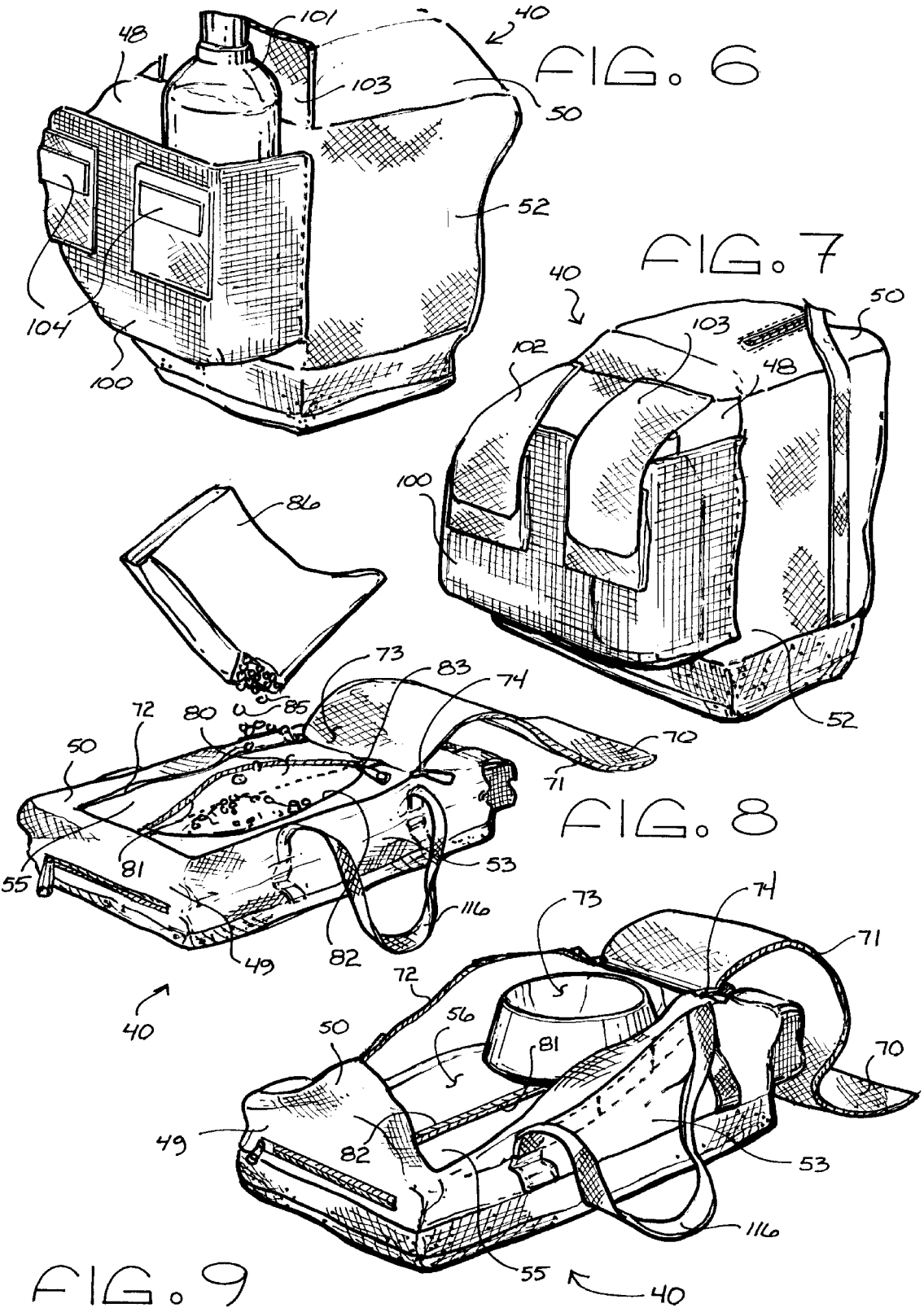

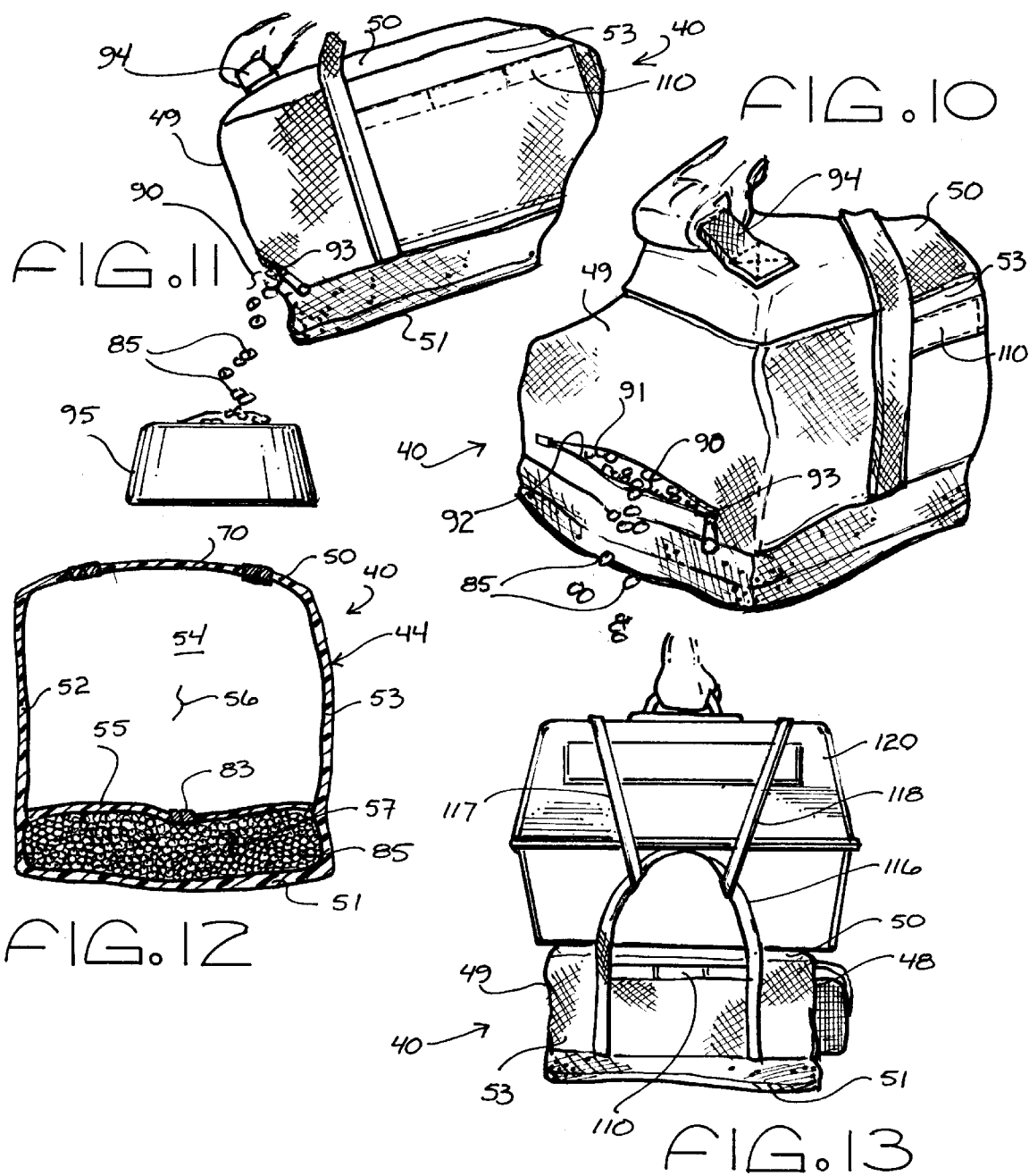

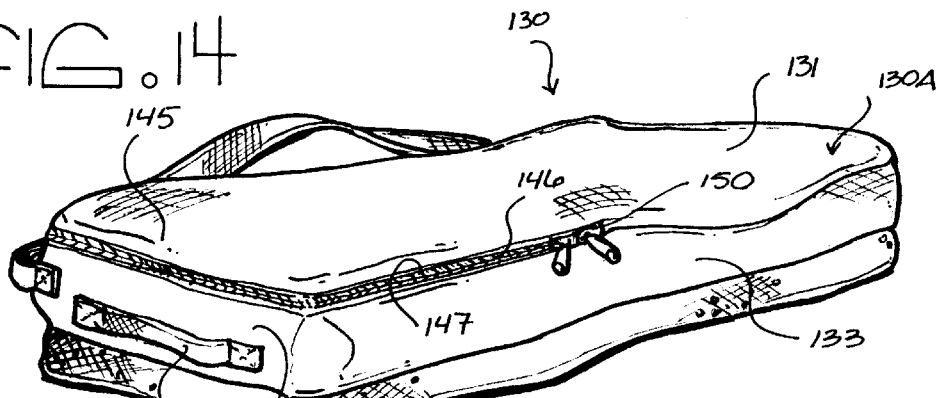
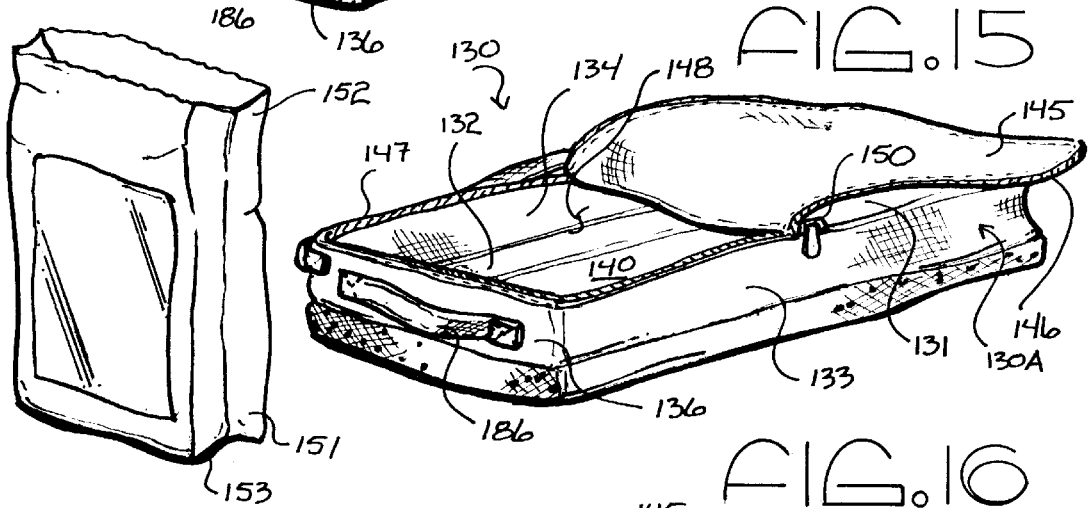
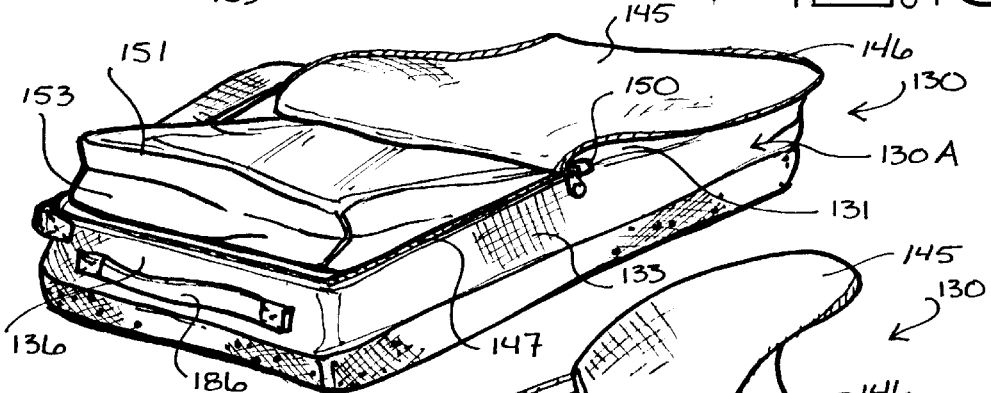
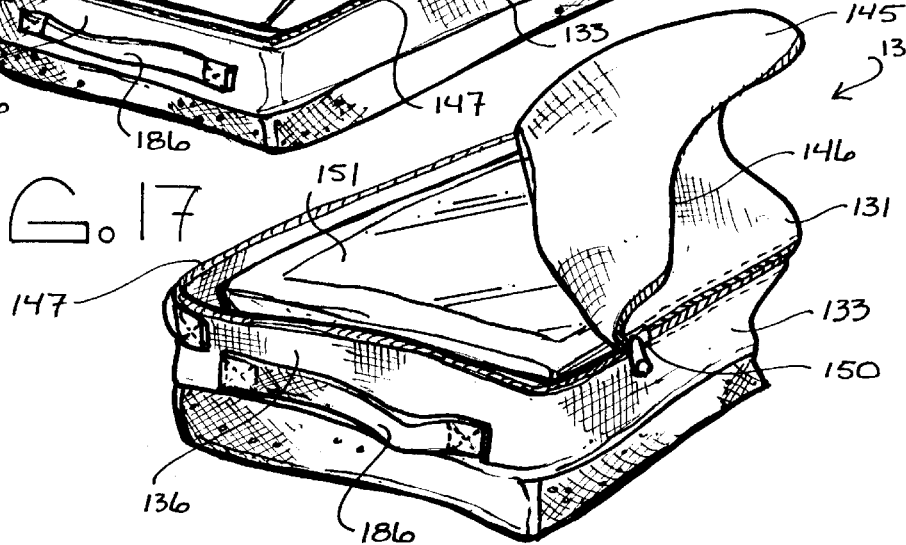

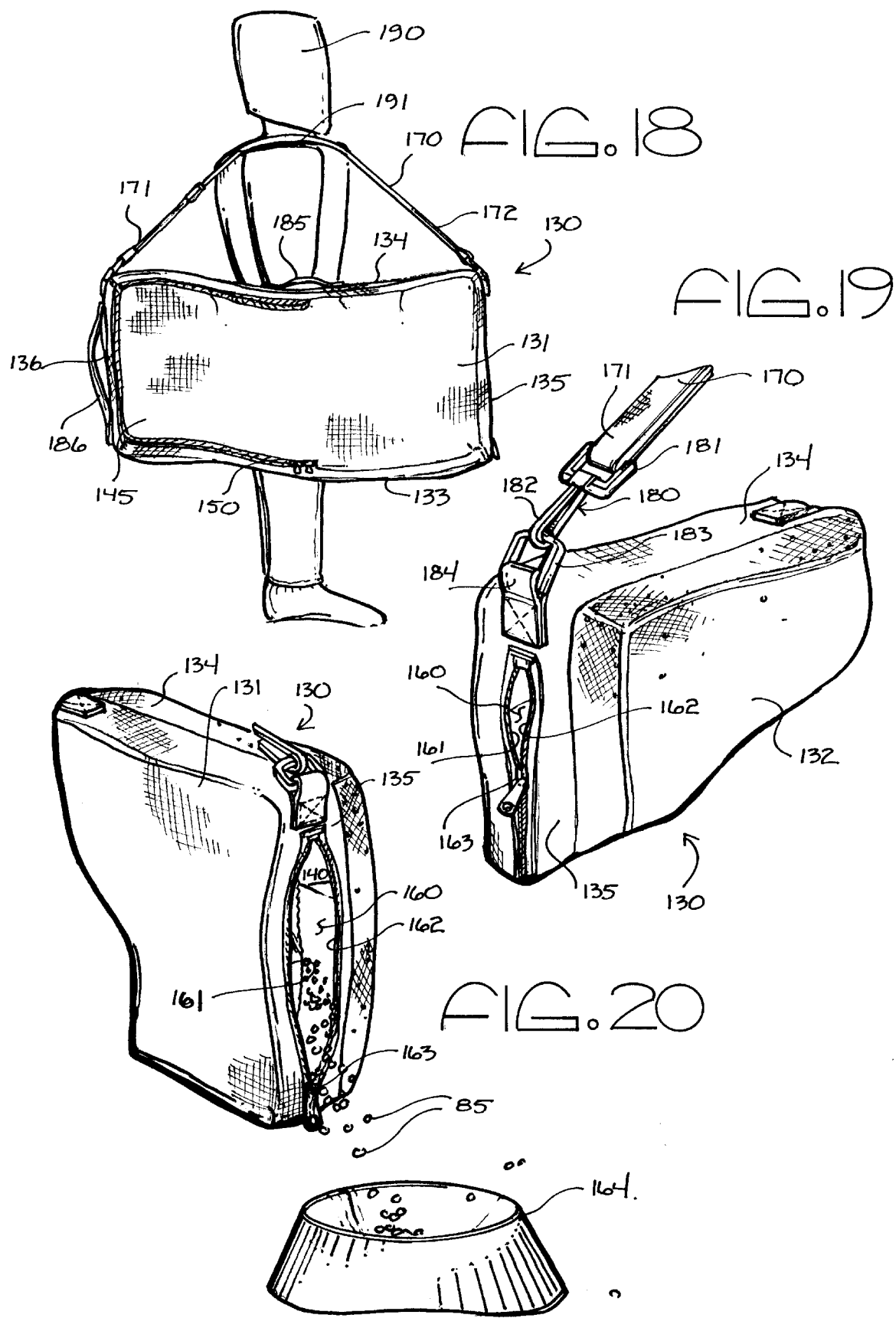

PET BAG

BACKGROUND OF THE INVENTION

1. Field of the Invention

This invention relates to bags.

More particularly, this invention relates to bags for storing and transporting selected items.

In a further and more specific aspect, the instant invention relates to pet bags for storing and transporting pet food, pet products and pet care items.

2. Prior Art

Dogs and cats are probably the most common of all domestic pets. However, like all domestic pets, they need to be fed and supplied with a variety of pet care products and items to facilitate proper care. Dry pet food is widely exploited by pet owners as the preferred food product because it is easy to store, easy to handle and nourishing. Food bowls, water bowls, bedding, toys, leashes, medication and grooming products such as shampoo, brushes, and the like, are a few of the basic items that most pet owners purchase and use in order to keep their pets well fed, healthy and happy. With the recent increased sensitivity directed to proper pet care, large pet stores have emerged which now offer pet owners a huge selection of pet food and other pet care products. As a result, pet owners are now purchasing more and more pet products to ensure the well being of their pets.

It has been noticed that transporting and storing pet food and pet products presents many difficulties. For instance, many pet owners, particularly those with dogs, purchase their dry pet food in at least 20 pound and 40 pound bags, and sometimes even larger. These heavy bags of pet food are difficult to transport, difficult to move and do not provide a satisfying means of storing the food over extended periods. For instance, after a bag of pet food is opened, which normally involves tearing the bag open, it can become increasingly torn or damaged over extended use which can lead to spillage of the food and frustration. Additionally, because pet food bags are not easily closed after opening, bugs and other insects can enter the pet food bag through the torn opening thus contaminating the food. In Addition, because pet food bags are normally constructed of paper and plastic, it is common for mice and rats to eat their way through the bag in order to access and eat the food. This can be especially dangerous to domestic pets as rats and mice can spread disease. Moreover, transporting and storing other pet products such as toys, medication, bedding and other pet products can also be challenging, especially for those pet owners who travel with their pets. In many instances, pet owners needlessly struggle with deciding how to store their pet food and pet products in an efficient and convenient manner.

It would be highly advantageous to provide pet owners with a transportation and storage device constructed in such a manner to facilitate ease and efficiency with the transport and storage of their pet products and pet food.

Accordingly, it is an object of the present invention to provide a pet bag for storing and transporting pet products and for storing and dispensing pet food.

Another object of the present invention is to provide a pet bag that is easy to use.

And another object of the present invention is to provide a pet bag that is easy to construct.

Still another object of the present invention is provide a pet bag that is easy to transport.

Yet another object of the instant invention is to provide a pet bag for keeping pet food safe from mice, rats and bugs.

Yet still another object of the instant invention is to provide a pet bag that is convenient.

And a further object of the invention is to provide a pet bag that is easy to clean.

Still a further object of the immediate invention is to provide a pet bag that keeps dry pet food dry for inhibiting the buildup of mold and for inhibiting premature decomposition of the dry pet food.

Yet a further object of the invention is the provision of inhibiting the frustration associated with the transportation and storage of pet food, pet products, and other pet care items.

And still a further object of the invention is to provide a method for storing and transporting pet products and other pet care items, and for storing, transporting and dispensing pet food.

And yet still a further object of the instant invention is to provide a method for storing, transporting and dispensing pet food.

SUMMARY OF THE INVENTION

Briefly, to achieve the desired objects of the instant invention in accordance with a preferred embodiment thereof, provided is a pet bag for storing and dispensing pet food. The pet bag is comprised of a chamber wall bounding an interior chamber. An access opening is formed through the chamber wall for accessing the interior chamber, whereby pet food may be placed into the interior chamber through the access opening for allowing efficient storage and transport of the pet food. A dispense opening formed through the chamber wall is also provided for allowing a user to selectively dispense the pet food from the interior chamber.

In another embodiment, provided is a pet bag for storing pet products and pet care items, and for storing and dispensing pet food. The pet bag is comprised of a chamber wall bounding an interior chamber. The interior chamber is divided into an upper compartment and a lower compartment by means of a partition panel coupled to the interior surface of chamber wall within the interior chamber. An access opening formed through the chamber provides access to the upper compartment. In addition, a partition panel access opening formed through the partition panel provides access from the upper compartment to the lower compartment, whereby pet food, preferably but not essentially dry pet food, may be introduced through the access opening and into the lower chamber through the partition panel access opening and pet products and pet care items may be placed within the upper chamber through the access opening for allowing efficient storage and transport of the pet food, pet products and pet care items. A dispense opening formed through the chamber wall allows a user to dispense the pet food from the lower compartment.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a perspective view of a pet bag constructed in accordance with a preferred embodiment, the pet bag being shown positioned next to a pet toy, a pet food bowl and a pet food bag;

FIG. 2 is a front end elevational view of the pet bag of FIG. 1;

FIG. 3 is a side elevational view of the pet bag of FIG. 1;

FIG. 4 is a rear end elevational view of the pet bag of FIG. 1;

FIG. 5 is another side elevational view of the pet bag similar to the view of FIG. 3;

FIG. 6 is a fragmented perspective view of an auxiliary compartment carried by portions of the pet bag of FIG. 1, the auxiliary compartment being shown as it would appear open;

FIG. 7 is a fragmented perspective view of the auxiliary compartment very similar to the view of FIG. 6, the auxiliary compartment being shown as it would appear closed;

FIG. 8 is a perspective view of dry pet food being dispensed into a lower compartment of the pet food bag of FIG. 1;

FIG. 9 is a perspective view of a pet food bowl positioned within an upper compartment of the pet food bag of FIG. 1;

FIG. 10 is a fragmented perspective view of dry pet food being dispensed from a dispense opening;

FIG. 11 is a side elevational view of the pet bag shown in FIG. 10, with dry pet food shown being dispensed into a pet food bowl;

FIG. 12 is a sectional view taken along line 12—12 of FIG. 1, the pet bag shown including an interior chamber having an upper compartment and a lower compartment, the lower compartment being further shown filled with dry pet food;

FIG. 13 is a side elevational view of the pet bag of FIG. 1, the pet bag being equipped with straps for bounding a pet crate supported by a user;

FIG. 14 is a perspective view of an alternate embodiment of a pet bag;

FIG. 15 is a perspective view of the pet bag shown in FIG. 14, the pet bag being shown as it would appear open for receiving a bag of pet food;

FIG. 16 is a perspective view of the pet bag similar to the view of FIG. 15, the pet bag being shown having the bag of pet food of FIG. 15 carried therein;

FIG. 17 is a fragmented perspective view somewhat similar to the view of FIG. 16;

FIG. 18 is a side elevational view of the pet bag of FIG. 14, the pet bag being shown equipped with a strap for engaging the shoulder of a user for facilitating the support and transport of the pet bag;

FIG. 19 is an enlarged fragmented perspective view of the pet bag of FIG. 18, the pet bag being shown having a dispense opening for dispensing pet food; and FIG. 20 is a perspective view somewhat similar to the view of FIG. 19, with dry pet food shown being dispensed through the dispense opening and into a pet food bowl.

DETAILED DESCRIPTION OF THE PREFERRED EMBODIMENTS

Turning now to the drawings, in which like reference characters indicate corresponding elements throughout the several views, attention is first directed to FIG. 1 which illustrates a first embodiment of the instant invention comprising a pet bag being generally designated by the reference character 40. Pet bag 40 provides a convenient and efficient means for storing and transporting a variety of pet products and pet care items such as chew toy 41 and pet bowl 42, and further provides a convenient and efficient means for storing, transporting and dispensing pet food, especially dry pet food which may be provided in food bag 43. Food bag 43 is typical of those available for purchase at pet stores and is of the variety normally constructed of paper and plastic sheet material.

With momentary reference to FIG. 12, shown is a sectional view taken along line 12—12 of FIG. 1. As can be seen in FIG. 12, pet bag 40 is comprised of a chamber wall 44 bounding an interior chamber 54. Chamber wall 44 includes a top panel 50, a bottom panel 51, opposite side panels, 52 and 53, and opposite end panels defined as front end panel 48 (FIG. 2) and rear end panel 49 (FIG. 4), all cooperating together to bound interior chamber 54. A partition panel 55, coextensive with interior chamber 54, is provided intermediate top panel 50 and bottom panel 51 for dividing interior chamber 54 into an upper compartment 56 and a lower compartment 57. Top panel 50, bottom panel 51 and partition panel 55 are substantially planar and are disposed in generally parallel and spaced relation respectively. Partition panel 55 is positioned closer to bottom panel 51 than top panel 50, thus making lower chamber 57 smaller than upper chamber 56, but this is not essential.

Upper compartment 56 is preferably but not essentially useful for storing a variety of pet products and pet care items such as bedding, toys, food and water bowls, leashes and other selected items. Lower compartment is preferably but not essentially useful for storing dry pet food, although canned pet food may also be stored therein as well. Top panel 50 and portions of side panels, 52 and 53, and front and rear end panels, 48 and 49, bounding upper compartment 56 are preferably constructed a substantially pliant material such as canvass or the like, although this is not essential. Moreover, bottom panel 51, partition panel 55, and portions of side panels, 52 and 53, and front and rear end panels, 48 and 49, bounding lower compartment 57 are preferably constructed of 18 ounce reinforced vinyl for keeping pet food dry, although this is not essential.

Referring back to FIG. 1, a flap 70 is formed in top panel 50. Flap 70, more easily seen in combination with FIG. 9, is preferably cut away from top panel 50 and includes an outer edge 71. An inner edge 72 remaining in top panel 50 from whence flap 70 is formed bounds an access opening 73, flap 70 being substantially coextensive with access opening 73. A conventional zipper assembly 74 is provided along outer edge 71 and continuous inner edge 72 operative for allowing a user to selectively open and close access opening 73 as desired. The specific details of zipper assembly 74 will not be herein specifically described as they will readily known to those having ordinary skill. Zipper assembly 74 is not essential, and other closure means or functional equivalents may be used such as buttons, snaps, or the like. It will readily occur to those having ordinary skill that access opening 73 may be opened for allowing a user to place selected items within upper compartment 56 and then closed for storing such items therein for transport or otherwise. As can be seen in FIG. 9, partition panel 55 is operative as a floor upon which selected items, such as pet bowl 75 in FIG. 9, may rest.

Referring to FIG. 8, a partition panel access opening 80 is provided and formed through partition panel 55. Opposed edges 81 and 82 define partition panel access opening 80 and a conventional zipper assembly 83 is provided for allowing a user to selectively open and close partition panel access opening 80 as desired, although other closure means may be used. Partition panel access opening 80 facilitates access from upper compartment 56 to lower compartment 57, and may be opened for allowing a user to introduce pet food 85 into lower compartment 57 from a bag 86 or other source and then closed for storing the pet food 85 therein for transport or otherwise as shown in FIG. 12. For the purposes of the instant discussion, pet food 85 is of the dry variety.

Referring now to FIG. 10, a dispense opening 90 is provided and formed through rear end panel 49 leading to lower compartment 57, although dispense opening 90 can be formed elsewhere. Opposed edges 91 and 92 define dispense opening 90 and a conventional zipper assembly 93 is provided for allowing a user to selectively open and close dispense opening 90 as desired, although other closure means may be used. Dispense opening 90 may be opened for allowing a user to dispense pet food 85 therefrom as shown in FIG. 10 and in FIG. 11 where pet food 85 is shown being dispensed into food bowl 95. A handle 94 coupled to top panel 50 may be provided for allowing a user to grip and support pet bag 40 during the dispensing of pet food 85, although this is not essential.

In addition to upper compartment 56 and lower compartment 57, pet bag 40 may be provided with one or more auxiliary pouches and/or pockets for allowing a user to store and transport additional items. For instance, in FIG. 1, shown is an auxiliary pouch 100 coupled to exterior surface 48A of front end panel 48, although auxiliary pouch 100 could be coupled elsewhere. Preferably constructed of a substantially pliant material, such as a mesh of cloth material, auxiliary pouch 100 is useful for holding a water bottle as shown in FIG. 6, or other items as desired. A pair of flaps, 102 and 103, best shown in FIG. 1 and FIG. 7, are provided for closing auxiliary pouch 100 for retaining items placed therein, and opening auxiliary pouch 100. Although not herein specifically shown in great detail, fastening elements 104 (FIG. 6) are provided on auxiliary pouch 100 for engaging flaps, 102 and 103, for closing auxiliary pouch 100. Although any variety of fastening means may be used, fastening elements 104, along with complemental fastening elements (not shown) provided with flaps, 102 and 103, are preferably provided as conventional hook and loop fasteners well known to those having ordinary skill. Furthermore, as can be seen in FIG. 1, FIG. 3 and FIG. 5, pockets 110 are provided on exterior surfaces, 52A and 53A, of side panels, 52 and 53, respectively, operative for holding items such as papers, grooming products, or other items as desired by a user. Pockets 110 provide a convenient means for storing items not suitable for storage within either auxiliary pouch 100, upper compartment 56 or lower compartment 57.

As can be seen in FIGS. 1–5, straps, 115 and 116, are shown coupled to portions of the exterior surfaces, 52A and 53A, of opposing side panels, 52 and 53, respectively. Preferably constructed of canvas or other selected pliant or substantially non-pliant material, straps, 115 and 116, may be easily grasp by a user for transporting pet bag 40. As can be seen in FIG. 13, straps, 115 and 116, may be provided with strap extensions, 117 and 118, interconnecting upper portions of strap 115 to upper portions of strap 116. A kennel or crate 120 may be placed upon top panel 50 of pet bag 40 and strap extensions, 117 and 118, may be wrapped around crate 120 for bounding crate 120 to pet bag 40. Crate 120, operative for transporting a pet, may then be gripped for transporting not only crate 120, but also pet bag 40. Although not essential, strap extensions, 117 and 118, provide a convenient means for allowing a user to transport a pet within crate 120 along with a variety of pet products and pet items stored upon or within pet bag 40.

It will be readily understood by those having ordinary skill that pet bag 40 is highly efficient for storing and transporting a variety of pet products and pet care items, and is highly efficient for safely storing, transporting and dispensing pet food. Lower compartment 57 keeps food dry and safe from rats, mice and insects. Additionally, pet bag 40 may be of any size suitable for intended use.

Attention is now directed to FIG. 14 and FIG. 15 illustrating an alternate embodiment of a pet bag being generally designated by the reference character 130. Having a generally rectangular shape, pet bag 130 is comprised of a chamber wall 130A bounding an interior chamber 140. Chamber wall 130A includes a top panel 131, a bottom panel 132, opposite side panels, 133 and 134, and opposite end panels defined as a front end panel 135 (FIG. 19 and FIG. 20) and a rear end panel 136, all cooperating together to bound interior chamber 140. Pet bag 130 is preferably constructed of 18 ounce reinforced vinyl, although this is not essential.

Portions of top panel 131 cut away from portions of opposite side panels, 133 and 134, and rear end panel 136, is a flap 145 having an outer edge 146. An inner edge 147 from whence flap 145 is formed or cut bounds an access opening 148, flap 145 being coextensive with access opening 148. A conventional zipper assembly 150, like zipper assembly 74 discussed previously in combination with pet bag 40, is provided along outer edge 146 and continuous inner edge 147 operative for allowing a user to selectively open and close access opening 148 as desired. The specific details of zipper assembly 150 will not be herein specifically described as they will readily known to those having ordinary skill. Zipper assembly 150 is not essential and other closure means or functional equivalents may be used such as buttons, snaps, or the like.

As shown in FIG. 15, flap 145 has been pulled back thereby exposing access opening 148 leading to interior chamber 140. It will readily occur to those having ordinary skill that access opening 148 may be opened for allowing a user to place dry pet food or perhaps a variety of other selected items within interior chamber 140. However, for the purposes of the instant discussion, interior chamber 140 is illustrated as receiving a bag 151 of pet food commonly available in pet stores, although this is not essential and pet food may be placed directly within interior chamber 140 if desired. In particular, bag 151 of pet food shown in FIG. 15 is shown having an upper end 152 which has been opened along substantially the entire length thereof and a closed lower end 153. In FIG. 16, bag 151 is shown having been inserted, upper end 152 first, through access opening 148 for placement of bag 151 within interior chamber 140 as shown in FIG. 17. Sized for substantially filling interior compartment 140, bag 151 is retained within interior compartment 140 with closed lower end 153 positioned opposite and abutting rear end panel 136 and open upper end 152 (not shown) of bag 151 positioned opposite and abutting front end panel 135.

Referring to FIG. 19 and FIG. 20, a dispense opening 160 is provided and formed through front end panel 135 for accessing interior chamber 140. Opposed edges, 161 and 162, bound opening 160 and a conventional zipper assembly 163 is provided for allowing a user to selectively open and close dispense opening 160 as desired, although other closure means may be used. Dispense opening 160 may be opened for allowing a user to easily dispense pet food 85 therefrom as shown in FIG. 20 where pet food 85 is being dispensed from bag 151 through upper end 152 and through dispense opening 160 into food bowl 164. Because upper end 152 is open and positioned opposite front end panel 135, the pet food contained within bag 151 is readily accessible for dispensing through dispense opening 160 when open. After dispensing, dispense access 160 may be closed for facilitating safe storage of the pet food. Because pet bag 130 is preferably constructed of 18 ounce reinforced nylon, the pet food is kept dry and insulated from mice, rats and insects. It will be readily understood that when bag 151 is empty, it may be removed and replaced with a new one.

Referring now to FIG. 18, an adjustable strap 170 is shown having opposite ends, 171 and 172, each coupled respectively to portions of front and rear end panels, 135 and 136, respectively. As shown in FIG. 19, each opposite end, 171 and 172, of adjustable strap 170 is coupled to pet bag 130 by means of a clip 180 (only one shown) each having an inner end 181 fixedly couple to a respective opposite end, 171 and 172, and an outer end 182 detachably coupled to a ring element 183 retained in a loop member 184 fixed to pet bag 130, although this is not essential and other means may be used. As shown in FIG. 18, a user 190 can place adjustable strap 170 over his or her shoulder 191 for facilitating easy transport of pet bag 130.

In addition, a first handle 185 (FIG. 18) coupled to side panel 134 proximate an intermediate location thereof may also be provided for allowing a user to grasp in order to carry pet bag 130. Moreover, a second handle 186 (FIGS. 14–18) coupled to rear end panel 136 proximate an intermediate location thereof opposite dispense opening 160 may also be provided, and when used in combination with handle 185, can provide an efficient and convenient means for aiding a user in dispensing pet food out of dispense opening 160. In particular, when dispensing pet food from interior chamber 140, a user may grasp handle 185 with one hand and grasp handle 186 with another hand, and then while grasping handles, 185 and 186, support and easily tilt pet bag 130 for pouring the pet food out of dispense opening 160 as shown in FIG. 20. Because pet bag 130 can become quite heavy when filled with pet food, handles, 185 and 186, provide a convenient means of aiding a user to easily support pet bag 130 to pour pet food out of dispense opening 160.

It will be readily understood by those having ordinary skill that pet bag 130 is highly efficient for storing, transporting and dispensing pet food. Pet bag 130 keeps pet food dry and safe from rats, mice and insects, and is easily transported with the use of either adjustable strap 170 or handle 185. Pet bag 130 may be provided in a variety of sizes for accommodating bags of pet food of various size, such as 10 pound bags, 20 pound bags, 40 pound bags, etc.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An apparatus for storing and dispensing pet food, comprising:

a bag of pet food having a closed end and an open end;

a chamber wall including a top panel, a bottom panel, opposite side panels a rear end panel and a front end panel cooperating together to bound an interior compartment to receive said bag of pet food of a size sufficient to substantially encompass said interior compartment with said rear end of said bag of pet food to locate opposite and substantially abut said rear end panel and said open end of said bag of pet food to locate opposite and substantially abut said front end panel;

a closure including a flap formed with said top panel and movable between a closed position for enclosing said chamber and an open position for admitting said bag of pet food into said interior chamber, an engagement element carried by said flap and a complemental engagement element carried by said chamber wall, said engagement element being detachably engageable with said complemental engagement element; and a dispense opening formed through said front end panel and movable between a closed position and an open position for facilitating the dispense of pet food outwardly therefrom from the open end of the bag of pet food.

2. An apparatus for storing and dispensing pet food, comprising:

a bag of pet food having a closed end and an open end;

a chamber wall including a top panel, a bottom panel, opposite side panels a rear end panel and a front end panel cooperating together to bound an interior compartment to receive said bag of pet food of a size sufficient to substantially encompass said interior compartment with said rear end of said bag of pet food to locate opposite and substantially abut said rear end panel and said open end of said bag of pet food to locate opposite and substantially abut said front end panel;

a closure formed with said top panel and movable between a closed position for enclosing said chamber and an open position for admitting said bag of pet food into said interior chamber; and a dispense opening formed through said front end panel and movable between a closed position and an open position for facilitating the dispense of pet food outwardly therefrom from the open end of the bag of pet food said dispense opening including opposed edges of said front end panel bounding said dispense opening to access said interior chamber at said open end of said bag of pet food and a zipper assembly carried by said opposed edges for closing and opening said dispense opening.

* * * * *